United States Patent Office 3,242,121
Patented Mar. 22, 1966

3,242,121
METHOD OF PREPARING LATEX BINDER OF STYRENE, AN ALKYL ACRYLATE, AND AN ETHYLENICALLY UNSATURATED CARBOXYLIC ACID
William F. Hill, Jr., South Charleston, W. Va., assignor to Union Carbide Corporation, a corporation of New York
No Drawing. Filed May 17, 1961, Ser. No. 110,643
7 Claims. (Cl. 260—29.6)

This invention relates to improved mineral-coating compositions having utility for the coating of cellulosic surfaces, and to a process for their preparation. In a particular aspect, this invention relates to pigmented aqueous dispersions of synthetic resinous polymers which, when applied to paper as a coating, improve the printing qualities and other properties of the paper.

Mineral coatings are applied to paper to improve the appearance, the printing qualities and other properties of the paper. The mineral coating covers the fibers of the paper surface and fills in the interstices in the surface and renders the paper more level and uniform in texture. It is primarily the pigment content of the coating composition which provides the desirable qualities of the coating, whereas the binder provides chiefly the function of adhering the mineral matter to the paper so that it will not be removed by the pull of printing ink during a printing opertaion or other such manipulations. The particular binder used has considerable effect upon the working qualities of the coating composition, such as the viscosity, flow, spreadability, and the like.

Heretofore starch or casein as a pigment binder for the pigment has been generally employed. The use of these binders has many disadvantages. Starch provides a paper having poor water resistance and the starch loses much of its adhesive ability when the coated paper is calendered. The use of starch or casein as a pigment binder presents the additional disadvantage that they vary in composition which causes variation in the composition of the coated paper on which they are employed. More recently, there also has been employed to a lesser degree pigmented aqueous dispersions of synthetic resinous polymers. However, such polymers have been found to be insufficiently adherent to the paper to reliably resist being picked by ink during printing operations.

It is an object of the present invention to provide an improved binder for use in paper coating compositions.

It is another object of the present invention to provide a novel process for preparing latex binder compositions having superior properties.

It is another object of the present invention to provide improved coated paper having good brightness, gloss affinity for printing inks, wet rub resistance and good folding qualities.

Other objects and advantages of the present invention will become apparent to those skilled in the art from the accompanying description and disclosure.

Accordingly, one or more objects of the present invention are accomplished by the production of an improved latex binder medium for mineral coating compositions by a novel process which comprises (1) adding over a period between one hour and eight hours and a temperature between 25° C. and 60° C. a monomer mixture comprising between about 40 and 65 weight percent alkyl acrylate, wherein said alkyl group contains between six and ten carbon atoms, between about 30 and 65 weight percent styrene, and between 3 and 10 weight percent of carboxylic acid selected from acrylic acid and methacrylic acid, to an aqueous polymerization medium comprising a redox catalyst, a nonionic emulsifier and an anionic emulsifier, for a total reaction period between about two hours and eight hours, (2) neutralizing the resulting latex with an alkaline compound to a pH between 6 and 10, and (3) adding a stabilizing quantity of nonionic emulsifier to the neutralized latex.

The aqueous dispersions produced by the process are combined with finely-divided pigmentary material such as domestic coating clay (kaolin), and applied to the surface of a paper product in the form of a coating. The coating imparts to the paper an advantageous combination of properties not heretofore provided by mineral coating compositions.

In the process, the monomer components are employed in proportions which provide a resin solids content between about 40 percent and 50 percent in the latex compositions, and preferably a resin solids content of between 45 percent and 48 percent.

The monomer charge is added to the polymerization medium over a period between about one hour and eight hours, and preferably for a period between about two hours and five hours. This delayed method of feeding the monomer charge to the polymerization medium is essential in the performance of the present process since it has been found that the mixing of the total monomer charge into the polymerizatnon medium at the beginning of the polymerization reaction produces final latex compositions which do not have all the desirable properties which are realized by the practice of the present invention process.

The polymerization reaction is conducted at a temperature in the range between about 25° C. and 60° C., and preferably in the range between about 35° C. and 45° C. The total polymerization reaction time is generally between about two hours and eight hours.

As mentioned hereinabove, the monomer charge comprises alkyl acrylate, styrene, and acrylic acid or methacrylic acid. The inclusion of the carboxylic acid component provides the highly desirable adhesiveness that the coatings exhibit when the compositions of the present invention are applied to paper. The alkyl acrylate component of the copolymers is limited to the alkyl acrylates wherein the alkyl group contains between six and ten carbon atoms, and preferably to those containing eight carbon atoms. A particularly preferred alkyl acrylate useful in the preparation of the dispersed resinous copolymers is 2-ethylhexyl acrylate.

A catalyst is employed in the present invention process which generates free radicals in the presence of water. Particularly preferred catalytic systems are those of the redox type. Such systems are combinations of oxidizing agents and reducing agents such as a combination of potassium persulfate and sodium metabisulfite. Other suitable peroxidic agents include the alkali metal and ammonium persulfates and perborates, hydrogen peroxide, organic hydroperoxides such as tertiary-butyl hydroperoxide and cumene hydroperoxide, and peresters such as tertiary-butyl perbenzoate. Other reducing agents include hydrazine, water-soluble thiosulfates, sulfites, sulfoxalates, bisulfites and hydrosulfites. Examples of these are sodium hydrosulfite, potassium sulfite, zinc formaldehydesulfoxalate and calcium bisulfite. The peroxidic catalyst can also be activated with a tertiary amine such as dimethylethanolamine or triethanolamine. Activators or promotors in the form of the salts, such as the sulfates or chlorides, of metals which are capable of existing in more than one valence state, such as cobalt, iron, nickel, copper and other polyvalent metals, may be used in activating quantities. The amount of total redox catalyst included in the aqueous emulsion polymerization recipes vary over a wide range, but in most cases, a catalyst concentration of between 0.5 and 2.0 weight percent, based on the weight of total monomer charge, is satisfactory, with 0.75 to 1.5 weight percent of catalyst being a preferred range. The activator is employed in the range of between about 0.2 and 1.0 parts per million of metal ion, based on the total weight of the latex, and preferably in the range of between 0.35 and 0.75 part per million of metal ion, based on the total weight of latex.

Both nonionic and anionic surface-active emulsifiers are employed in the polymerization reaction system. The nonionic emulsifier and anionic emulsifier are employed in a ratio between about 2 and 12 parts of nonionic emulsifier per part of anionic emulsifier, and preferably in a ratio of about 3 parts of nonionic emulsifier per part of anionic emulsifier. The total weight of the emulsifier additive is maintained in a range between about 2 and 10 weight percent, based on the weight of the total monomer charge. Emulsifiers which are applicable include a water-soluble anionic emulsifiers such as alkyl sulfate salts, alkyl aryl sulfonates, salts of fatty acids, alkyl sulfosuccinate salts, and the like; and the water-soluble nonionic emulsifiers such as ethylene oxidenonylphenol adducts, aromatic sulfonate-formaldehyde condensation products, glycerol-fatty acid derivatives, polyoxylated sorbitan fatty acid derivatives, oxethylated amides, and the like.

Typical anionic emulsifiers include diisobutylphenoxyethoxyethoxyethyl sodium sulfonate, sodium laurate, sodium oleate, sodium palmitate, sodium glyceryl monolaurate sulfate, dioctyl sodium sulfosuccinate, sodium rosinate, sodium lauryl sulfate, sodium tetradecyl sulfate, sodium 2-ethylhexyl sulfate, and the like.

Typical nonionic emulsifiers include alkylphenoxypolyethoxyethanols having alkyl groups of about seven to twelve carbon atoms such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; ethylene oxide derivatives of long-changed carboxylic acids such as lauric, myristic, palmitic, oleic, or mixture of acids such as found in tall oil; ethylene oxide condensates of long-chained alcohols such as octyl, decyl, lauryl, or ethyl alcohols, ethylene oxide derivatives of etherified or esterified polyhydroxy compounds having a hydrophobic hydrocarbon chain, and the like.

After the polymerization reaction step of the invention process has been completed, the resulting latex composition is treated with alkali so as to increase the pH into the range between about 6 and 10, and preferably in the range between about 7 and 8. The simple expediency of adjusting the pH of the latex formulation into the alkaline range provides several outstanding advantages. Excellent stability of both a mechanical and chemical nature is imparted to the composition. The "ionic" carboxylate salt groups formed at the carboxyl positions along the polymer chains act as a built-in "protective colloid." The presence of these "ionic" positions in the polymer chain gives the polymer an outstanding ability to disperse pigments in the latex coating formulation. Any alkaline material can be employed to adjust the pH. Metal hydroxides and amines are applicable such as potassium hydroxide, sodium hydroxide, piperidine, dimethyl aniline, morpholine, monoethanolamine, and the like. Ammonium hydroxide is the particularly preferred alkaline reagent because of its low cost and high volatility.

As a further unexpected aspect of the present invention, it has been discovered that the neutralized latex produced as described hereinabove can be stabilized to the presence of multivalent salts such as, for example, calcium chloride, by the post-addition of a stabilizing quantity of emulsifier. This particular stabilization effect was unexpected since it cannot be satisfactorily accomplished by increasing the quantity of emulsifier originally employed in the polymerization recipe. The desirable stabilization effect can only be achieved by this "post-addition" of emulsifier. The nonionic emulsifiers have been found to be preferred for this purpose. The stabilizing quantity of emulsifier added is in the range between about 0.75 and 5.0 weight percent, based on the total weight of the latex composition, and preferably a quantity in the range between about 0.75 and 1.5 weight percent.

The dispersed resinous copolymer in the latex prepared according to the process of the present invention is characterized as having a reduced viscosity in the range between about 0.5 and 1.5, a second order transition temperature in the range between about $-45°$ C. and $20°$ C., and a particle size in the range between about $0.05\mu$ and $0.2\mu$. In the particularly preferred latices the dispersed resin has a reduced viscosity in the range between about 0.6 and 1.1, a second order transition temperature in the range between about $-10°$ C. and $10°$ C., and a particle size in the range between about $0.05\mu$ and $0.15\mu$.

By the term "reduced viscosity" as used herein is meant the expression:

$$I_r = \frac{T-T_0}{(T_0)(C)}$$

wherein T is the time required for a low concentrate polymer solution to pass through a standardized Ubbelhode viscometer; wherein $T_0$ is the time for the pure solvent to pass through the viscometer; and wherein C is the concentration of the solution. The concentration of the solution is 0.2 gram in 100 milliliters of cyclohexanone, and the measurement is conducted at $25°$ C., unless otherwise specified.

The term "second order transition temperature ($T_G$)" as used herein refers to the inflection temperature which is found by plotting the modulus of rigidity against temperature. A convenient method for determining modulus of rigidity and transition temperature is described by I. Williamson, British Plastics, 23, 87–90, 102 (September 1950).

Paper coating mineral compositions are prepared by admixing the latex described above with a pigmentary matter suitable for application in paper coatings. The pigmentary matter may be any of the finely-divided mineral materials commonly employed in the preparation of paper coating compositions, such as clays (particularly of the kaolin type), calcium carbonate, talc, blanc fixe, titanium dioxide, colored lakes and toners, tinctorial, oxides ochre, carbon black, graphite, chrome yellow, molybdate orange, toluidine red, copper phthalocyanines, such as the "Monastral" blue and green lakes and finely-divided metals such as aluminum (powder or flakes), and the like. The term "mineral" is meant to include all such types of pigmentary matter both of the inorganic and partly organic classes. The quantity of pigmentary matter dispersed in the paper coating compositions can vary broadly. Generally, the resinous copolymer in the coating composition is employed in a quantity between about 6 and 20 weight percent, based on the weight of pigment dispersed therein, and preferably is employed in a quantity between about 8 percent and 16 percent.

The pigment or pigments are preferably mixed and dispersed in a small amount of water before admixing with the resinous copolymer latex composition. It is preferred to employ clay in a predominant proportion in the pigment additive.

After combining the pigment and copolymer dispersions the resulting coating composition is applied to paper or paperboard or other cellulosic substrate at a total solids concentration of about 60 percent, and preferably in the range between about 50 percent and 70 percent. Any suitable means can be employed to apply the coatings, such as immersion roll and doctor system, gravure roller system, brush coater, trailing blade coater, air-knife coater, or spray coater. After the coating operation, the coated sheet is dried, and can then be calendered, and subsequently printed. Printing can be effected by the conventional inks of peneration, evaporation, drying oil, precipitation or heat-setting type. The coated products of the present invention are receptive to single-color inks and multi-color inks and are able to withstand the pull of such inks.

The mineral coated paper products obtained by the practice of the present nivention have superior qualities as compared to those heretofore known and produced in the art. The present compositions require a lower quantity of binder in proportion to the pigment to provide an excellent adhesive coating which does not separate from the paper surface when submitted to printing operations. The coatings of the present invention when applied to paper are characterized by good adhesion for printing, good vehicle hold-out, excellent ink receptivity, superior folding qualities and very good wet rub resistance.

The following examples will serve to illustrate specific embodiments of the invention.

Pick resistance is determined by running an adhesive coated roller across the coated paper and noting the type of failure. When the coating is removed without lifting the fibers of the paper, the failure is called "coating" failure. When the paper is torn or delaminated the failure is "raw stock" failure. In general, the greater the amount of coating applied on the paper the more difficult it is to obtain raw stock failure. Thus, raw stock failure at about 40 to 50 percent coating weight based on the original paper weight is considered to be an excellent performance.

Wet rub resistance is noted as the amount of coating removed by rubbing the coated paper in contact with water. A rating of 10 indicates no removal of the coating. To be useful, a binder must be effective at low concentrations and must be relatively inexpensive.

In the examples, the trademark materials have the following compositions:

| | |
|---|---|
| Calgon | Sodium tetrapyrophosphate. |
| Tergitol NPX | Nonylphenol polyethylene glycol ether (Union Carbide). |
| Tergitol NP-35 | Nonylphenol polyethylene glycol ether (Union Carbide). |
| Duponol ME | Sodium lauryl sulfate. |
| Rhoplex B-15 | Acrylic copolymer latex (Rohm & Haas). |

EXAMPLE 1

One hundred parts of fine coating clay (kaolin), 0.3 part "Calgon" and 0.15 part of concentrated ammonium hydroxide were mixed with 35 parts of water to form a smooth dispersion. To this dispersion was added 13 parts of an aqueous dispersion containing 6 parts of a resinous binder consisting of 55 weight percent 2-ethylhexyl acrylate, 40 weight percent styrene and 5 weight percent acrylic acid. Said aqueous dispersion was prepared by an emulsion polymerization process comprising the delayed addition of a mixture of the monomers to an aqueous polymerization medium containing deionized water, 2.25 weight percent Tergitol NPX, 0.75 weight percent Duponol ME, 1.5 weight percent potassium persulfate-sodium bisulfite (2:1) and ferrous sulfate, based on total weight of monomer, as an activator for the redox catalyst system (0.72 p.p.m. $Fe^{++}$ based on the weight of aqueous dispersion). The polymerization was conducted at a temperature of about 40° C. for a total reaction time of four hours. The monomer components were added over a period of two and one-half hours. After the polymerization reaction was completed, the resulting latex was treated with a quantity of concentrated ammonium hydroxide sufficient to adjust the pH to a value of 7.5. The neutralized latex was then treated with 1.0 weight percent as an aqueous dispersion of Tergitol NP-35, based on the weight of the neutralized latex.

Standard coating grade paper was then coated with the above composition so that one sheet contained a coating of about 30 percent by weight of the original sheet, one sheet contained a coating of about 50 percent by weight of the original sheet, and two other sheets contained 50 percent by weight and 55 percent by weight of the coating based on the weights of the respective sheets. The coated sheets were force-dried for five minutes at 250° F. The sheets had a smooth surface, particularly useful for printing, and exhibited excellent resistance to removal by tacky inks used in the printing industry.

EXAMPLE 2

The procedure of Example 1 was repeated except that no activator was used for the redox catalyst system. A concentration of binder, based on the weight of clay, in Example 1, was 6 percent. In this example the quantity of binder required for adequate pick resistance was 7 weight percent based on the weight of the clay. The weights of coating applied were 30 percent, 40 percent and 65 percent, respectively, based on the original weight of the paper.

EXAMPLE 3

The procedure of Example 1 was repeated except that distilled water was used in place of deionized water and no activator was used for the redox catalyst system. The distilled water had a conductivity of about five times that for the deionized water used in Example 1. In this example, the quantity of binder required for adequate pick resistance was 6 percent, based on the weight of the clay. The weights of coating applied were 25 percent, 50 percent and 60 percent, respectively, based on the original weight of the paper.

EXAMPLES 4 THROUGH 9

Several latices were prepared in the same manner as Example 1 except that the quantities and kinds of reactants were varied and the reaction conditions were varied. Pertinent data relating to the polymerization runs are listed in Table I.

The latices were neutralized with concentrated ammonium hydroxide, and to each of the latices fine coating clay (kaolin) was added as a dispersion in water. The mineral coated compositions so produced were applied to regular grade paper-coating raw stock and tested for pick resistance and wet rub resistance. Pertinent data relating to the testing of the latices are listed in Table II.

*Table I*

| Ex. No. | Monomer Composition[1] | | | | Emulsifier[2] | | Catalyst[3] | | $T_a$ | pH | Feed Time (hrs.) | Reaction Temp. (° C.) |
|---|---|---|---|---|---|---|---|---|---|---|---|---|
| | OA | Sty. | AA | AAm | NPX | ME | $K_2S_2O_8$ | $NaHSO_3$ | | | | |
| 4 | 50 | 45 | 5 | -------- | 2.25 | 0.75 | 1.0 | 0.5 | 44 | 7.4 | 2 | 25–34 |
| 5 | 65 | 30 | 5 | -------- | 2.25 | 0.75 | 1.0 | 0.5 | 44 | 7.4 | 2 | 28–34 |
| 6 | 55 | 40 | 5 | -------- | 2.25 | 0.75 | 1.0 | 0.5 | 46 | 7.5 | 2 | 35–40 |
| 7 | 40 | 55 | 5 | -------- | 2.25 | 0.75 | 0.50 | 0.25 | 44.1 | 7.2 | 2+ | 25–45 |
| 8 | 55 | 38 | 7 | -------- | 1.50 | 1.50 | 0.5 | 0.5 | 44 | 7.5 | 2 | 29–38 |
| 9 | 50 | 40 | 5 | 5 | 2.25 | 0.75 | 1.0 | 0.5 | 43 | 7.4 | 2 | 28–37 |

[1] OA=2-ethylhexyl acrylate; Sty.=Styrene; AA=Acrylic acid; AAm=Acrylamide; parts by weight, based on total monomer weight.
[2] NPX="Tergitol" NPX; ME="Duponol" ME; weight percent, based on the weight of total monomers.
[3] Weight percent, based on the weight of total monomers.

*Table II*

| Latex | Binder Con., Percent[1] | Pick Resistance[2] Failure at Percent CW | | | | Water Resistance[3] Percent CW | | |
|---|---|---|---|---|---|---|---|---|
| | | C | C+ | RS− | RS | Low | Med. | High |
| Ex. 4 | 6 | -------- | 65 | 50 | 45 | 9 | 9 | 9 |
| Ex. 4 | 10 | -------- | -------- | -------- | 70 | 10 | 10 | 10 |
| Ex. 5 | 4 | -------- | 70 | 35 | -------- | 5 | 6 | 6 |
| Ex. 5 | 6 | -------- | -------- | -------- | 65 | 7 | 8 | 8 |
| Ex. 5 | 10 | -------- | -------- | -------- | 70 | 10 | 10 | 10 |
| Ex. 6 | 6 | -------- | -------- | -------- | 50 | 7 | 8 | 8 |
| Ex. 7 | 6 | 30 | -------- | -------- | -------- | 4 | 1 | 1 |
| Ex. 7 | 10 | -------- | 65 | -------- | 75 | 7 | 8 | 8 |
| Ex. 8 | 6 | -------- | -------- | -------- | 65 | 7 | 8 | 8 |
| Ex. 9 | 10 | -------- | -------- | -------- | 90 | 7 | 8 | 8 |

[1] Weight percent, based on clay pigment weight.
[2] C = Coating failure; RS = Raw stock failure = best performance; Percent CW = Percent by weight of coating on the weight of paper, the higher the percent CW to give RS failure the better the coating.
[3] Ten is the highest rating.

EXAMPLES 10 THROUGH 15

Several latices were prepared in the same manner as Example 1 except that the amounts and kinds of reactants were varied and the reaction conditions were varied. Pertinent data relating to the preparation of these latices are listed in Table III.

The latices prepared above were admixed with an aqueous dispersion of fine coating clay and applied to paper to test the pick resistance and wet resistance of the compositions when coated on paper. A standard commercial latex coating composition was also tested for comparison purposes. Pertinent data are listed in Table IV.

Blends of starch and a commercial latex coating composition, and of starch and the latex produced in Example 12, were mixed with clay binder, applied to paper sheets, and tested for pick resistance and rub resistance. The pertinent data obtained from these tests are listed in Table V.

*Table III*

| | Ex. 10 | Ex. 11 | Ex. 12 | Ex. 13 | Ex. 14 | Ex. 15 |
|---|---|---|---|---|---|---|
| Monomer Composition: | | | | | | |
| 2-Ethylhexyl Acrylate | 60 | 65 | 55 | 55 | 55 | 55 |
| Styrene | 35 | 30 | 40 | 40 | 40 | 40 |
| Acrylic Acid | 5 | 5 | 5 | -------- | -------- | 5 |
| Methacrylic Acid | -------- | -------- | -------- | 5 | -------- | -------- |
| Monobutyl Maleate | -------- | -------- | -------- | -------- | 5 | -------- |
| Emulsifiers: | | | | | | |
| "Tergitol" NPX | 4.25 | 4.25 | 4.25 | 4.25 | 4.25 | 2.25 |
| "Duponol" ME | 0.75 | 0.75 | 0.75 | 0.75 | 0.75 | 0.75 |
| "Tergitol" NP-35[1] | -------- | -------- | -------- | -------- | -------- | 1.0 |
| Catalyst: | | | | | | |
| $K_2S_2O_8$ | 1.0 | 1.0 | 1.0 | 1.0 | 1.0 | 1.0 |
| $NaHSO_3$ | 0.5 | 0.5 | 0.5 | 0.5 | 0.5 | 0.5 |
| pH | 7.5 | 7.5 | 8.2 | 7.6 | 7.5 | 7.3 |
| Monomer Feed (Hours) | 2 | 2 | 2+ | 2 | 2 | 2.5 |
| Reaction temperature (° C.) | 35–41 | 35–40 | 35–42 | 35–40 | 35–40 | 35–42 |

[1] Example 15—"Tergitol" NP-35 post-added, 1 percent by weight, based on the weight of latex.

*Table IV*

| Latex | Percent Binder | Pick Results Failure at Percent CW | | | | Web-Rub Resistance[1] Percent CW | | |
|---|---|---|---|---|---|---|---|---|
| | | C | C+ | RS− | RS | Low | Med. | High |
| Example 10 | 6 | 70 | -------- | 60 | 45 | 6 | 7 | 7 |
| Example 11 | 6 | -------- | -------- | 95 | 50 | 6 | 7 | 7 |
| Example 12 | 8 | -------- | -------- | -------- | 75 | 8 | 9 | 9 |
| Example 12 | 8 | -------- | -------- | -------- | 75 | 7 | 8 | 8 |
| Example 13 | 6 | -------- | -------- | 75 | 50 | 4 | 4 | 4 |
| Example 14 | 6 | -------- | 70 | 50 | -------- | 3 | 4 | 4 |
| Rhoplex B-15 | 6 | -------- | 50 | 40 | -------- | 3 | 3 | 4 |
| Rhoplex B-15 | 8 | -------- | -------- | -------- | 70 | 4 | 5 | 5 |
| Example 25 | 6 | -------- | -------- | -------- | 70 | 7 | 8 | 8 |
| Example 15 | 8 | -------- | -------- | -------- | 85 | 8 | 8 | 9 |

[2] 10=Best performance.

Table V

| Latex | Percent Binder | Pick Results Failure at percent CW | | | | Wet-Rub Resistance Percent CW | | |
|---|---|---|---|---|---|---|---|---|
| | | C | C+ | RS− | RS | Low | Med. | High |
| Starch/Rhoplex B-15: 70/30 | 8 | 75 | 50 | | | 2 | 2 | 2 |
| | 12 | | 85 | 50 | 25 | 2 | 2 | 2 |
| | 16 | | | 85 | 50 | 3 | 3 | 3 |
| Starch/Example 12: 70/30 | 8 | | | 60 | | 3 | 3 | 3 |
| Starch/Example 12 plus 1 percent NP-35: 70/30 | 8 | | 70 | 55 | | 3 | 3 | 3 |

What is claimed is:

1. A method for producing an improved latex binder medium for mineral coating compositions which comprises (1) adding over a period between about one hour and eight hours and a temperature between about 25° C. and 60° C. as the sole monomers charge, a preformed mixture comprising between about 40 and 65 weight percent alkyl acrylate, wherein said alkyl group contains between about six and ten carbon atoms, between about 30 and 65 weight percent styrene, and between about 3 and 10 weight percent of carboxylic acid selected from the group consisting of acrylic acid and methacrylic acid, to an aqueous polymerization medium comprising a redox catalyst, a nonionic emulsifier and an anionic emulsifier in a ratio of between about 2 and 12 parts of nonionic emulsifier per part of anionic emulsifier, for a total reaction period between about two hours and eight hours, (2) neutralizing the resulting latex with an alkaline compound to a pH between about 6 and 10, and (3) adding a stabilizing quantity of nonionic emulsifier to the neutralized latex.

2. The method of claim 1 wherein ammonium hydroxide is employed to neutralize the latex.

3. The method of claim 1 wherein the quantity of emulsifier added in step (3) is in the range between about 0.75 and 5.0 weight percent, based on the total weight of the latex.

4. The latex composition produced by the method of claim 1.

5. A method of producing a paper coating composition which comprises admixing the latex produced by the process of claim 1 with coating pigmentary material.

6. The paper coating composition produced by the method of claim 5.

7. As an article of manufacture, a paper product coated with the composition of claim 6.

References Cited by the Examiner

UNITED STATES PATENTS

| | | | |
|---|---|---|---|
| 2,753,318 | 7/1956 | Maeder | 260—29.6 |
| 2,795,564 | 6/1957 | Conn et al. | 260—29.6 |
| 2,962,465 | 11/1960 | Lindstrom et al. | 260—29.6 |

MURRAY TILLMAN, *Primary Examiner.*

LEON J. BERCOVITZ, SAMUEL H. BLECH, *Examiners.*